2,901,439
Patented Aug. 25, 1959

2,901,439

CORROSION REDUCTION

John T. Burke, Jr., Pittsburgh, Pa., assignor to National Aluminate Corporation, Chicago, Ill., a corporation of Delaware No Drawing. Application October 3, 1956
Serial No. 613,605

6 Claims. (Cl. 252—389)

This invention, in general, relates to the reduction of corrosion of mild carbon steel in contact with corrosive nitrogen fertilizer solutions.

The production and use of nitrogen fertilizer solutions is becoming increasingly popular. Distributing these corrosive solutions, however, is a real problem. Ammonium nitrate solutions and urea solutions containing ammonia gas dissolved in water eat through standard carbon steel containers in about three years. Present protective devices for the steel containers such as coatings add little to this life span. Small cracks or pin holes in plastic coatings have proved to be fatal to the coating. Once the nitrogen solution works through to the underlying metal, it corrodes the metal container, and the coating begins to flake off. Rubber coatings on the other hand are reported to be vulnerable at the seams. Glass linings and stainless cladding are too expensive to provide an economical answer to the corrosion problem. In the light of the number of standard carbon steel containers involved in the distribution of nitrogen fertilizer solutions (tank cars, distributor storage tanks, tank trucks, farmers' storage tanks, field tanks and applicator tanks), this corrosion problem assumes sizable proportions.

It is an object of this invention to provide methods to minimize the corrosive action of nitrogen fertilizer solutions on standard carbon steel.

A further object is to provide means to prolong the life of standard carbon steel containers for corrosive nitrogen fertilizer solutions such as ammonium nitrate solutions and urea-ammonia liquors.

The compositions for reducing corrosion of ferrous metals contacted by nitrogen fertilizer solutions are mixtures of several ingredients. The active essential ingredients are cobalt-catalyzed-sodium sulfite and lignin derivatives soluble in alkaline solutions and resulting from hydrolysis in caustic alkali of sodium lignin sulfonate, such as that obtained from the sulfite pulp process, at a temperature within a range of 265° to 325° C. under superatmospheric pressure for a period of 30 to 120 minutes. The latter compositions may be described as demethylated lignin compounds. They and the method of preparation thereof are more particularly described in United States Patent No. 2,505,457, issued April 25, 1950, and United States Patent No. 2,505,304, issued April 25, 1950, the disclosures of which are incorporated herein by reference.

Polyphosphates may also be included in the composition. Preferred polyphosphates are alkali metal polyphosphates such as sodium tripolyphosphate ($Na_5P_3O_{10}$) and any of the water-soluble polyphosphate glasses or so-called molecularly dehydrated phosphates in which the ratio of $Na_2O$ to $P_2O_5$ is variable including those known as "sodium hexametaphosphate" and "glassy septaphosphate," as well as complexes containing calcium and sodium, magnesium and sodium, and aluminum and sodium. When the ingredients are pressed into a solid form, e.g., into ball shape as is common in water treating balls, a binder such as dextrin is used. Alkaline compositions (sodium hydroxide and sodium carbonate) also may be included in the composition—particularly when the ingredients are pressed into a solid form—as solubilizing agents for the lignin compositions at the surface of the solid. Sodium nitrate preferably is added to urea-ammonia solutions.

The corrosion-inhibiting compositions are of the following general composition with regard to the active, essential ingredients. The percentages are by weight.

|  | General | Preferred |
|---|---|---|
|  | Percent | Percent |
| Sodium sulfite | 15–70 | 25–50 |
| Water-soluble cobalt salt | 0.01–1.0 | 0.05–1.0 |
| Lignin derivative | 10–35 | 20–30 |

Sodium nitrate and the polyphosphates, where employed, are used in the general range of 3–15% and preferred range of 5–10%.

The metals used in ordinary tank cars, ordinary storage tanks, and various other tanks and containers used by the farmer is generally described as a mild carbon steel. More technically speaking, the carbon steel to which this invention is applicable falls within the S.A.E. classification of carbon steels between S.A.E. No. 1006 and S.A.E. No. 1050.

Urea-ammonia liquor may be comprised of urea, ammonium carbonate, ammonia and water. Some of these liquors contain minor amounts of formaldehyde. The corrosion-inhibiting compositions of this invention are added to the urea-ammonia liquor or ammonium nitrate solutions within the general range of 25–500 p.p.m. preferably 50–300 p.p.m.

Corrosion test

In a typical urea-ammonia liquor comprising 43% urea, 16% ammonium carbonate, 24% ammonia, and 17% water, corrosion tests using mild steel specimens were conducted for 1,080 hours. One sample was treated with 5,000 p.p.m. of waste sulfite liquor, and the corrosion rate was 92 m.p.y. A composition comprising:

| Ingredients | Percent |
|---|---|
| Soda ash | 14.5 |
| Sodium sulfite | 38.0 |
| Mixture of 90— sodium sulfite and 10— Cobalt sulfate monohydrate | 1.0 |
| Tripolyphosphate of soda | 5.0 |
| Sodium nitrate | 5.0 |
| Lignin derivative | 26.0 |
| Dextrin | 6.0 |
| Sodium hydroxide | 3.0 |
| Sodium 2,4,5-trichlorophenol | 0.2 |
| Water | 1.3 | was tested at 150 p.p.m. concentration. The corrosion of the steel specimens was only 8 m.p.y.

The invention is hereby claimed as follows:

1. A method for protecting mild carbon steel containers against corrosion by corrosive nitrogen fertilizer solutions contained therein which comprises adding to said containers containing said corrosive solutions 25–500 p.p.m. of a corrosion-inhibiting composition composed of the following ingredients expressed as weight percentages of the corrosion-inhibiting composition, 15–70% sodium sulfite, 0.01–1% of a cobalt salt, and 10–35% lignin derivatives soluble in alkaline solutions and resulting from hydrolysis in caustic alkali of sodium lignin sulfonate at a temperature within the range of 265° C. to 325° C. under superatmospheric pressure for 30 to 120 minutes.

2. A method for protecting mild carbon steel containers against corrosion by corrosive ammonium nitrate solutions contained therein which comprises adding to said containers containing said corrosive solutions 25–500 p.p.m. of a corrosion-inhibiting composition composed of the following ingredients expressed as weight percentages of the corrosion-inhibiting composition, 15–70% sodium sulfite, 0.01–1% of a cobalt salt, and 10–35% lignin derivatives soluble in alkaline solutions and resulting from hydrolysis in caustic alkali of sodium lignin sulfonate at a temperature within the range of 265° C. to 325° C. under superatmospheric pressure for 30 to 120 minutes.

3. A method for protecting mild carbon steel containers against corrosion by corrosive urea-ammonia solutions contained therein which comprises adding to said containers containing said corrosive solutions 25–500 p.p.m. of a corrosion-inhibiting composition composed of the following ingredients expressed as weight percentages of the corrosion-inhibiting composition, 15–70% sodium sulfite, 0.01–1% of a cobalt salt, 3–15% sodium nitrate and 10–35% lignin derivatives soluble in alkaline solutions and resulting from hydrolysis in caustic alkali of sodium lignin sulfonate at a temperature within the range of 265° C. to 325° C. under superatmospheric pressure for 30 to 120 minutes.

4. A method for protecting containers made from mild carbon steel having an S.A.E. number between 1006 and 1050 against corrosive action by corrosive nitrogen fertilizer solutions contained therein characterized by the incorporation into said corrosive solutions of 50–300 p.p.m. of a corrosion inhibiting composition composed of the following ingredients expressed as weight percentages of the corrosion-inhibiting composition, 15–70% sodium sulfite, 0.01–1.0% of a cobalt salt, and 10–35% lignin derivatives soluble in alkaline solutions and resulting from hydrolysis in caustic alkali of sodium lignin sulfonate at a temperature within the range of 265° C. to 325° C. under superatmospheric pressure for 30 to 120 minutes.

5. A method for protecting containers made from mild carbon steel having an S.A.E. number between 1006 and 1050 against corrosive action by corrosive ammonium nitrate solutions contained therein characterized by the incorporation into said corrosive solutions of 50–300 p.p.m. of a corrosion-inhibiting composition composed of the following ingredients expressed as weight percentages of the corrosion-inhibiting composition, 15–70% sodium sulfite, 0.01–1.0% of a cobalt salt, and 10–35% lignin derivatives soluble in alkaline solutions and resulting from hydrolysis in caustic alkali of sodium lignin sulfonate at a temperature within the range of 265° C. to 325° C. under superatmospheric pressure for 30 to 120 minutes.

6. A method for protecting containers made from mild carbon steel having an S.A.E. number between 1006 and 1050 against corrosive action by corrosive urea-ammonia solutions contained therein characterized by the incorporation into said corrosive solutions of 50–300 p.p.m. of a corrosion-inhibiting composition composed of the following ingredients expressed as weight percentages of the corrosion-inhibiting composition, 15–70% sodium sulfite, 0.01–1.0% of a cobalt salt, 3–15% sodium nitrate, and 10–35% lignin derivatives soluble in alkaline solutions and resulting from hydrolysis in caustic alkali of sodium lignin sulfonate at a temperature within the range of 265° C. to 325° C. under superatmospheric pressure for 30 to 120 minutes.

References Cited in the file of this patent

UNITED STATES PATENTS

| | | |
|---|---|---|
| 2,505,457 | Bird | Apr. 25, 1950 |
| 2,613,131 | Barnes et al. | Oct. 7, 1952 |